(12) United States Patent
Fukami et al.

(10) Patent No.: US 7,683,376 B2
(45) Date of Patent: Mar. 23, 2010

(54) LIQUID-CRYSTAL DISPLAY DEVICES AND REPAIRING METHOD THEREFOR

(75) Inventors: Tetsuo Fukami, Ishikawa (JP); Kenji Nakao, Ishikawa (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 416 days.

(21) Appl. No.: 11/620,302

(22) Filed: Jan. 5, 2007

(65) Prior Publication Data

US 2007/0159436 A1    Jul. 12, 2007

(30) Foreign Application Priority Data

Jan. 12, 2006   (JP) .............................. 2006-005345

(51) Int. Cl.
*H01L 27/14* (2006.01)
(52) U.S. Cl. .............................. 257/72; 257/40; 257/59; 257/71; 257/81; 257/91
(58) Field of Classification Search .................. 257/71, 257/91; 349/39, 49
See application file for complete search history.

(56) References Cited

U.S. PATENT DOCUMENTS

2005/0051778 A1*   3/2005   Chang ........................ 257/72

FOREIGN PATENT DOCUMENTS

JP          9-113936          5/1997

* cited by examiner

*Primary Examiner*—N Drew Richards
*Assistant Examiner*—Kyoung Lee
(74) *Attorney, Agent, or Firm*—Oblon, Spivak, McClelland, Maier & Neustadt, L.L.P.

(57) ABSTRACT

A liquid-crystal display device of OCB mode, comprising: signal and scanning lines arranged on an insulator substrate as the signal lines are intersected by the scanning lines to form intersections; pixel-dot TFTs arranged respectively in vicinity of the intersections and connected respectively with pixel electrodes, with the signal lines and with the scanning lines; and a repair-use construction for each pixel dot, which is convertible to a diode electrically connecting one of the pixel electrodes on the each pixel dot, to one of the signal lines.

2 Claims, 7 Drawing Sheets

LIQUID-CRYSTAL DISPLAY DEVICES AND REPAIRING METHOD THEREFOR

CROSS-REFERENCE TO RELATED APPLICATION

This application is based upon and claims the benefit of priority from the prior Japanese Patent Application No. 2006-5345, filed on Jan. 12, 2006; the entire contents of which are incorporated herein by reference.

FIELD OF THE INVENTION

This invention relates to a liquid-crystal display device (LCD) of "optically compensated bend (OCB)" mode and to its repairing method.

BACKGROUND ART

In manufacturing of active-matrix LCD devices, defective pixels are "repaired". As a method for repairing after an assembling process, a following technique has been proposed, for example. A repair-use region or repair circuit is arranged at each pixel dot. On repairing, the repair-use region is irradiated with laser beams from reverse side of transmissive array substrate as to melt a metal pattern in the repair-use region and induce short circuiting of the pixel electrode with a gate wiring pattern. In this way, a luminous dot of the defective pixel is converted to a dark dot. Please see JP-1997 (09)-113936A, or Japan's patent application publication No. 9-113936, for example.

On repairing the LCD device of OCB mode, two categories of techniques have been conceived. First category among them is those converting the luminous dot to the dark dot by applying a direct-current voltage onto a pixel electrode; and second category is those severing out a conductive pattern for forming a pixel capacitance (storage capacitance, Cs) from a pixel electrode.

Figure 7:
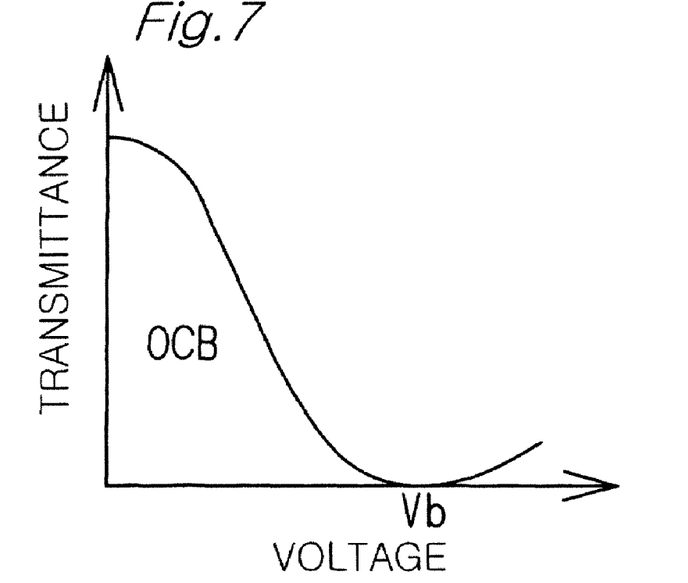
FIG. 7 is a graph showing a relationship between transmittance and a voltage applied to a liquid crystal layer in an OCB-mode LCD device, as a prior-art disclosure.

The repairing techniques of the first category have following problems. FIG. 7 shows a relationship between applied voltage and transmittance for a liquid crystal layer in pixels of the OCB-mode LCD. Displaying of black tone or of tones close to the black tone requires direct-current voltage value in vicinity of a given value "Vb" for applying to the liquid crystal layer. Voltage value applied to the liquid crystal layer is difference between a common voltage (Vcom) on a counter electrode and a voltage applied on a pixel electrode; and hence, displaying of black or of near-black tone requires applying onto the pixel electrode a voltage in vicinity of either one of two voltages (Vcom+Vb, Vcom−Vb) that are smaller and larger than the common voltage (Vcom) by the given value "Vb". Thus, freedom or flexibility on setting a direct-current voltage to be applied on a defective pixel dot is limited. Moreover, some wirings in a pattern layer of signal lines or of storage capacitance (Cs) lines are required solely for applying the direct-current voltage on occasion of repairing the luminous dot. Consequently, aperture ratio (a percentage of light transmissive region in each pixel dot) would be decreased; and parasite capacitances would be formed between the wirings solely for applying the direct-current voltage and other wirings, at their crossing points or overlapping regions as to increase load for driving the LCD.

The repairing techniques of the second category also have a problem in that patterns or wirings for severing the pixel electrode from the pattern for pixel capacitance are required, as to decrease the aperture ratio.

BRIEF SUMMARY OF THE INVENTION

A liquid-crystal display device of OCB mode, comprises: signal and scanning lines arranged on an insulator substrate as the signal lines are intersected by the scanning lines to form intersections; pixel-dot TFTs arranged respectively in vicinity of the intersections and connected respectively with pixel electrodes, with the signal lines and with the scanning lines; and a repair-use construction for each pixel dot, which is convertible to a diode electrically connecting one of the pixel electrodes on the each pixel dot, to one of the signal lines.

A repairing method of a liquid-crystal display device of OCB mode, comprises: arranging signal and scanning lines on an insulator substrate so as the signal lines are intersected by the scanning lines to form intersections; arranging pixel-dot TFTs that are respectively in vicinity of the intersections and connected respectively with pixel electrodes, with the signal lines and with the scanning lines; connecting one of the pixel electrodes, on a defective pixel dot, to one of the signal lines through a diode; and disconnecting said one of the pixel electrode from associated one of the pixel-dot TFTs.

DETAILED DESCRIPTION OF THE INVENTION

Figure 8:
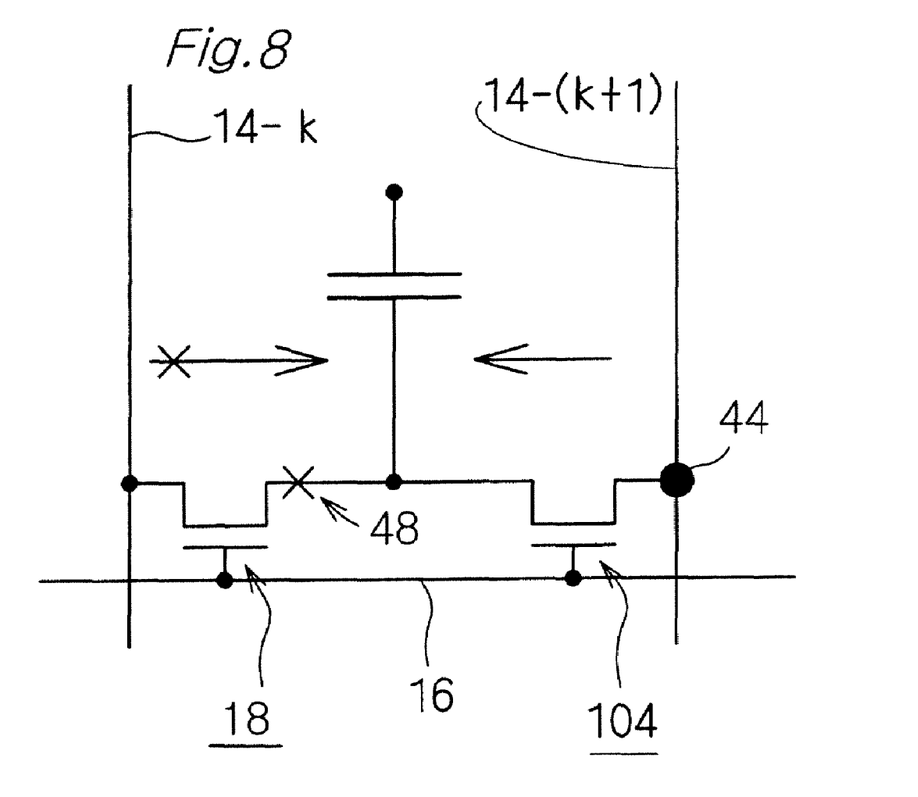
FIG. 8 is a diagram of an equivalent circuit for a pixel dot having a redundant TFT in a comparative example, corresponding to the FIG. 1.
Figure 9:
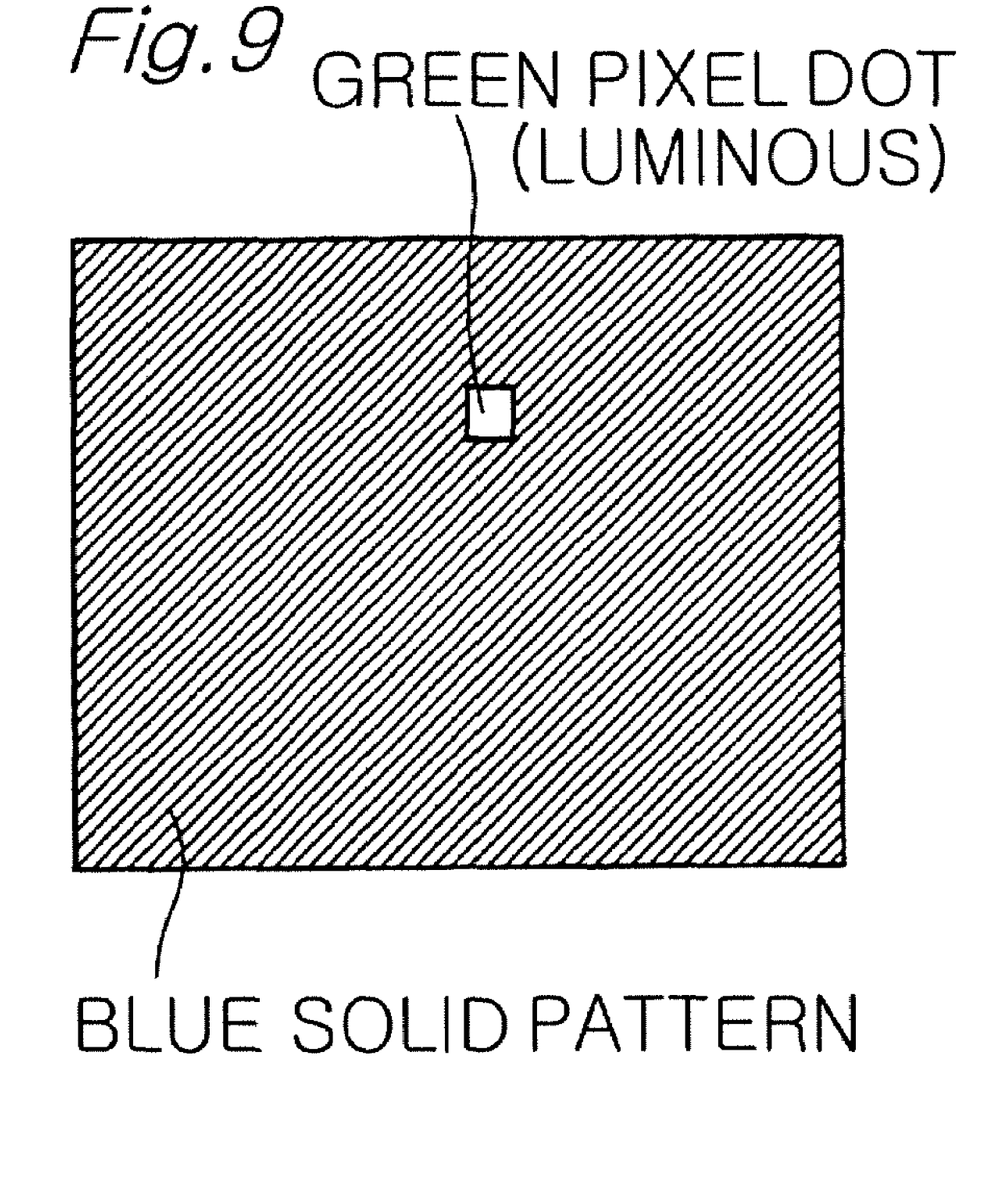
FIG. 9 is a schematic illustration of a problem resulted from construction of FIG. 8, in which a green pixel dot becomes luminous even within a solid pattern of blue color.

In view of the problems in aforementioned techniques for repairing the luminous dots, there has been conceived a technique for arranging a redundant thin film transistor (TFT) 104 on each pixel dot in addition to a primary or pixel-dot TFT 18, as shown in FIG. 8. The redundant TFT 104 is required to achieve an electric charging of the pixel electrode in a level matching the primary pixel-dot TFT 18; and thus, arranging of the redundant TFT 104 would increase the load for driving the LCD in respect of inputting to gate (scanning) lines 16 and/or signal lines 14 would be increased, and decrease the aperture ratio. Moreover, by repairing, a pixel electrode of defective pixel dot is disconnected to a signal line 14-k by laser cutting to form a laser cut portion 48; and is connected with a next signal line 14-(k+1) through the redundant TFT 104 and through a contact portion 44, which is a kind of contact hole construction formed by laser beam irradiation, as in FIG. 8. The technique arranging the redundant TFT 104 has also a following problem. A solid pattern of a single color (blue color for example) may be displayed on a screen region including the repaired pixel dot; and then, brightness of the repaired pixel dot (in a green color for example) would become higher than other pixel dots in same elementary color (for the green color and now in dark, for example) within the solid pattern. Such a brighter pixel dot may be conceived as a kind of luminous dot as indicated in FIG. 9, even though brightness of the repaired pixel dot should be smaller than the other pixel dots in same elementary color.

In view of the above, it is aimed and investigated to facilitate converting of a luminous dot into a dark dot in respect of the OCB-mode LCD device and its manufacturing or repairing method; by applying a black-displaying voltage onto a pixel electrode on the defective pixel dot.

In following, an OCB-mode LCD device 10 according to one embodiment of the invention will be explained by use of FIGS. 1-6. The OCB-mode LCD device 10 is of a normally white mode. When to display a video image or motion picture, orientation of OCB-mode liquid crystal molecules has to be switched from a non-transmissive splay alignment to a transmissive "bend alignment" and be maintained for a while in the bend alignment. Thus, high voltage (Vb) application for inserting a black fractional frame between image fractional frames (at Vs) is carried out in each video frame Fr (FIG. 6) with a predetermined duration ratio or percentage in the video frame Fr, so as to avert reverse rotation of the liquid-crystal molecules back into the splay alignment. A voltage adopted in the inserting of a black fractional frame is generally same as a black-displaying voltage and is set to be optimum value for displaying of black dots.

Figure 1:
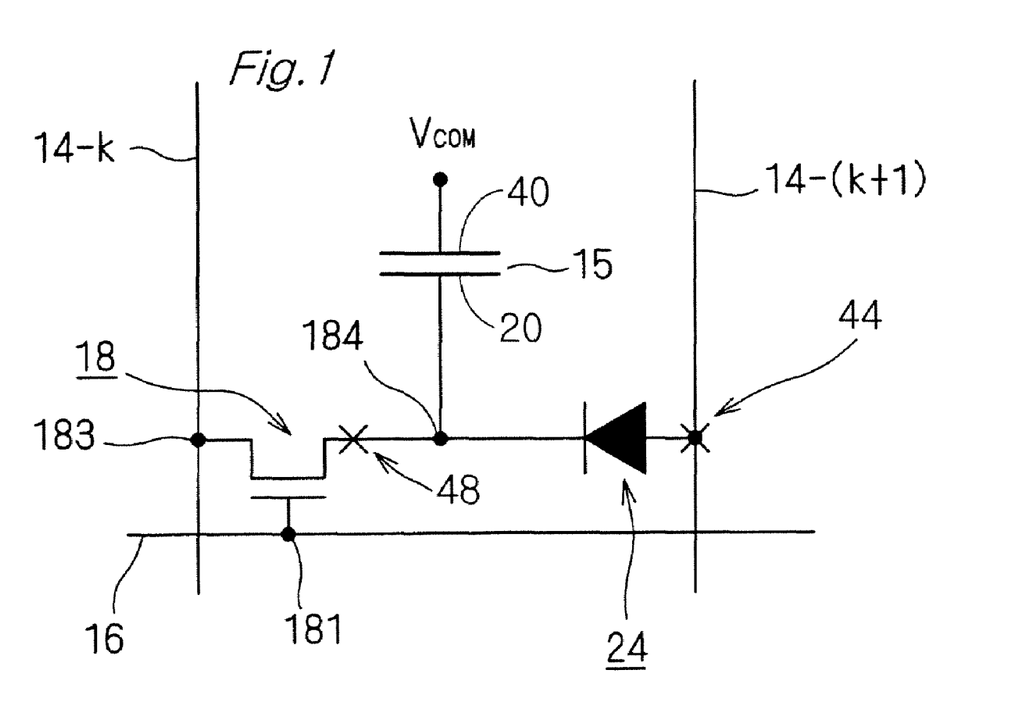
FIG. 1 is a diagram of an equivalent circuit for a pixel dot in a liquid-crystal display according to one embodiment of the invention.
Figure 2A:
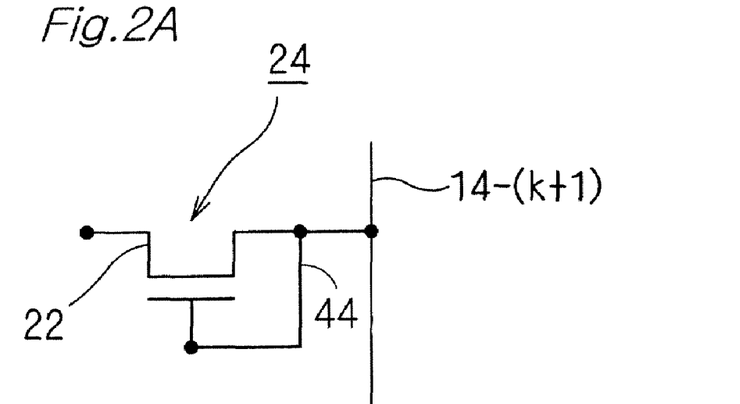
FIG. 2A is a circuit diagram of a diode for repairing, which is formed by modifying a TFT.
Figure 2B:
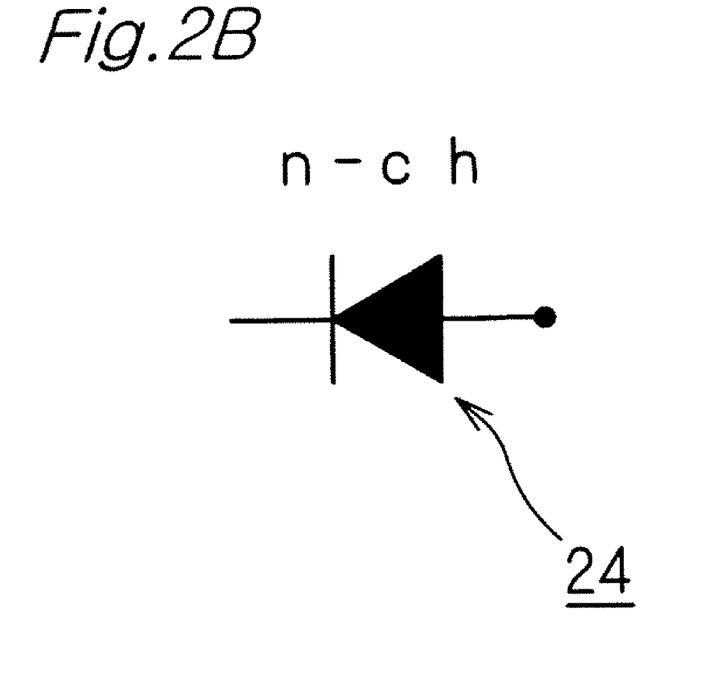
FIG. 2B is a notation representing an n-channel diode as one type of diode for repairing.
Figure 2C:
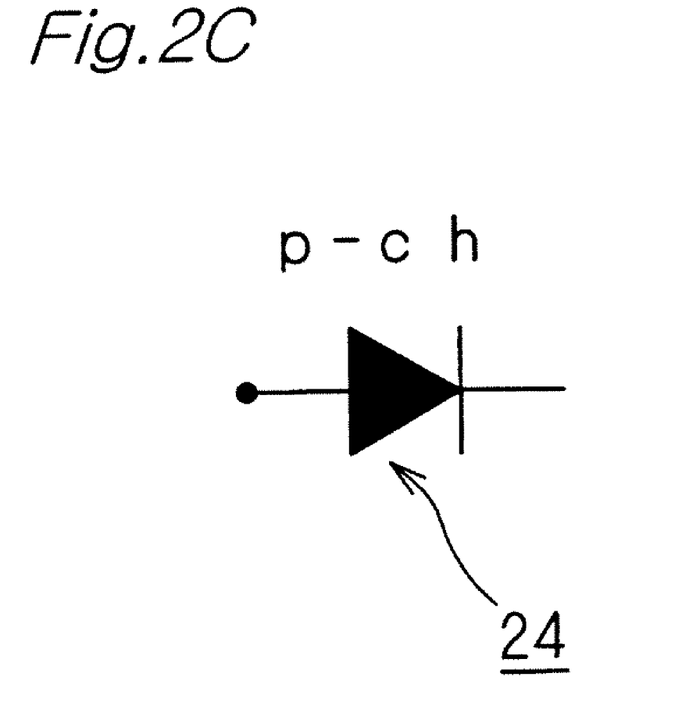
FIG. 2C is a notation representing a p-channel diode as another type of diode for repairing.
Figure 3:
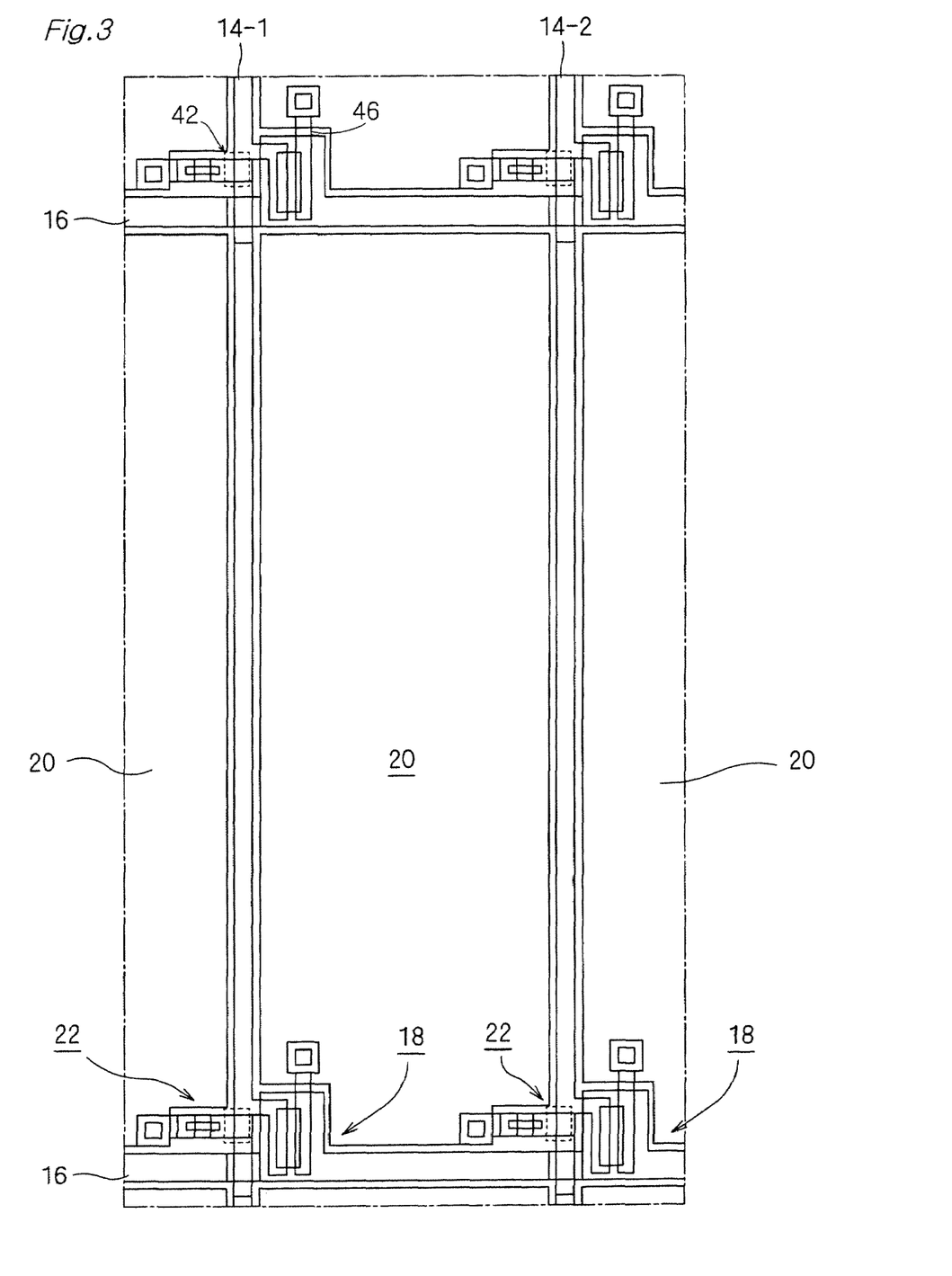
FIG. 3 is a plan view of a pixel dot corresponding to the embodiment shown in FIG. 1.

An equivalent circuit of a pixel dot and some other constructions of the OCB-mode LCD device 10 is explained, by use of FIGS. 1-3 in particular. An array substrate 12 (FIGS. 5A and 5B) of the OCB-mode LCD device 10 is formed of a glass substrate 13 that is an insulator substrate. On the array substrate 12, there are arranged signal lines 14-1, . . . , 14-k, 14-(k+1), . . . , 14-N in a number of "N"; in other words, 1st to Nth signal lines are arranged. And, 1st to "Mth" scanning lines 16-1, . . . , 16-M in a number of "M" are arranged in a manner to orthogonally intersect the signal lines. In vicinity of each of intersections of the signal lines 14 and scanning lines 16, there is formed a pixel-dot thin film transistor (referred to as pixel-dot TFT) 18; a gate electrode 181 of which is connected to a scanning line 16, a source electrode 183 of which is connected to a signal line 14, and a drain electrode 184 of which is connected with a pixel electrode 20. In a face-to-face arrangement vis-à-vis the array substrate 12, a not-illustrated counter substrate is arranged; and an OCB-mode liquid-crystal layer 15 is arranged in a gap between the array and counter substrates. A counter electrode 40 formed on inner face of the counter substrate is applied with a common voltage Vcom.

A gate driver circuit provides gate signals respectively to the scanning lines 16. When the pixel-dot TFT 18 becomes "ON" with the gate signal, a signal voltage applied to one of the signal lines 14 is then provided to the pixel electrode 20 to accumulate an electric charge in it. When subsequently the pixel-dot TFT 18 becomes "OFF", a level of voltage in the pixel electrode 20 is kept for a while. The OCB-mode liquid-crystal layer 15 realizes a transmittance or a reflectivity that corresponds to voltage difference between the common voltage Vcom and the voltage of the pixel electrode 20, which has been or to be provided with an electric charge through the pixel-dot TFT 18. In this way, each dot of video image is displayed on a screen as corresponding to the signal-line voltage applied to the signal line 14.

Figure 4:
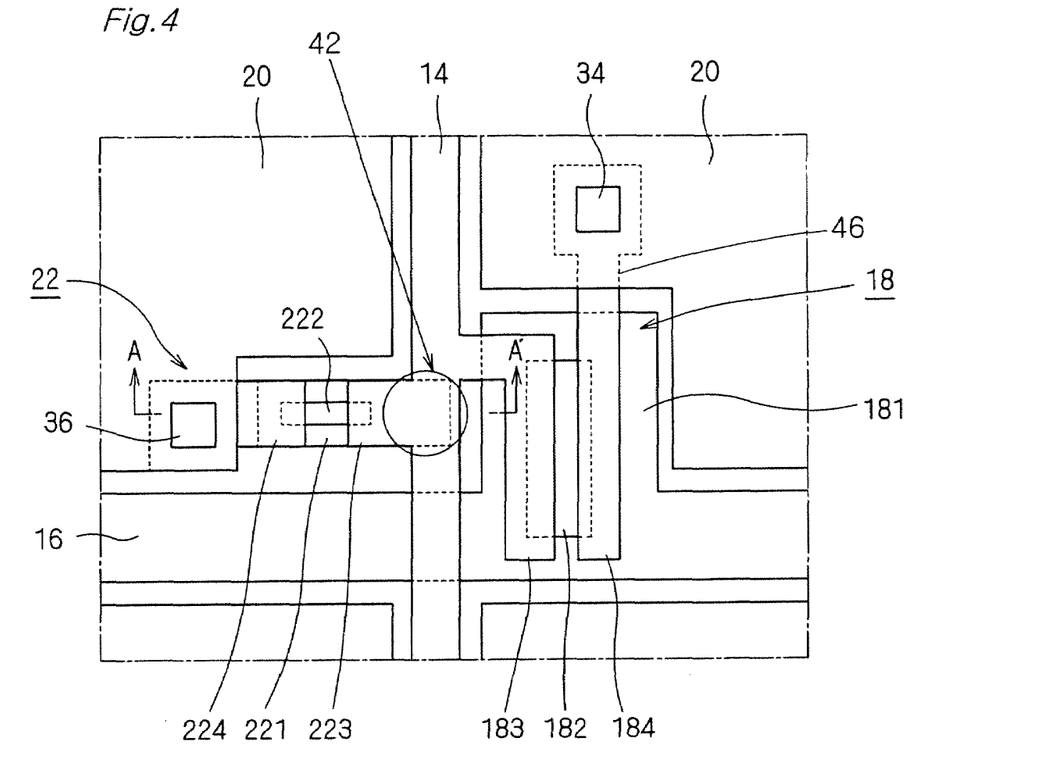
FIG. 4 is an enlarged plan view showing a portion of the pixel dot shown in FIG. 3.
Figure 5A:
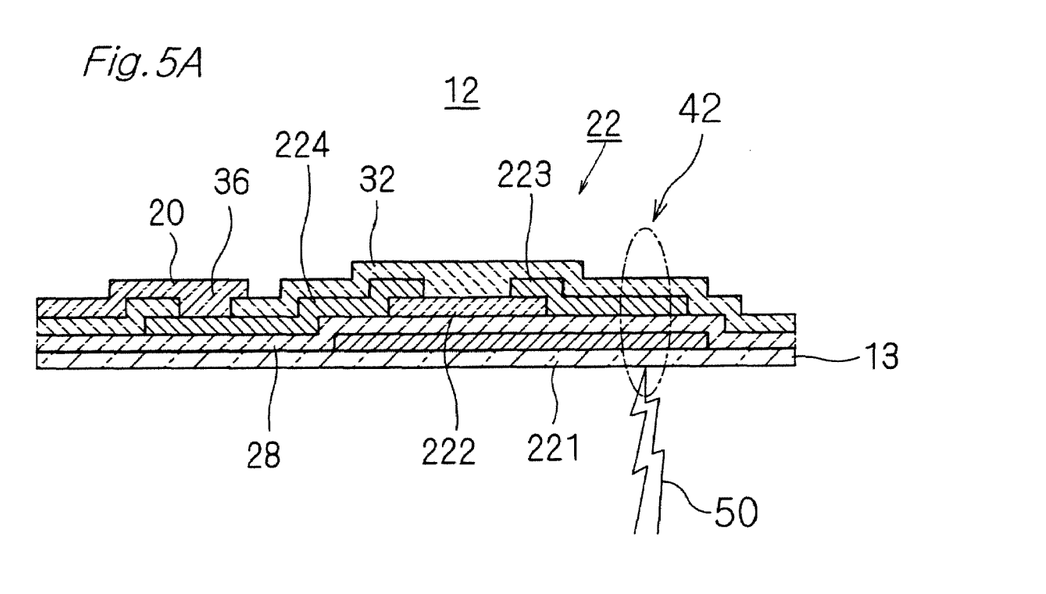
FIGS. 5A and 5B are sectional views schematically showing a section cut along A-A' line on FIG. 4 before and after the repairing.
Figure 5B:
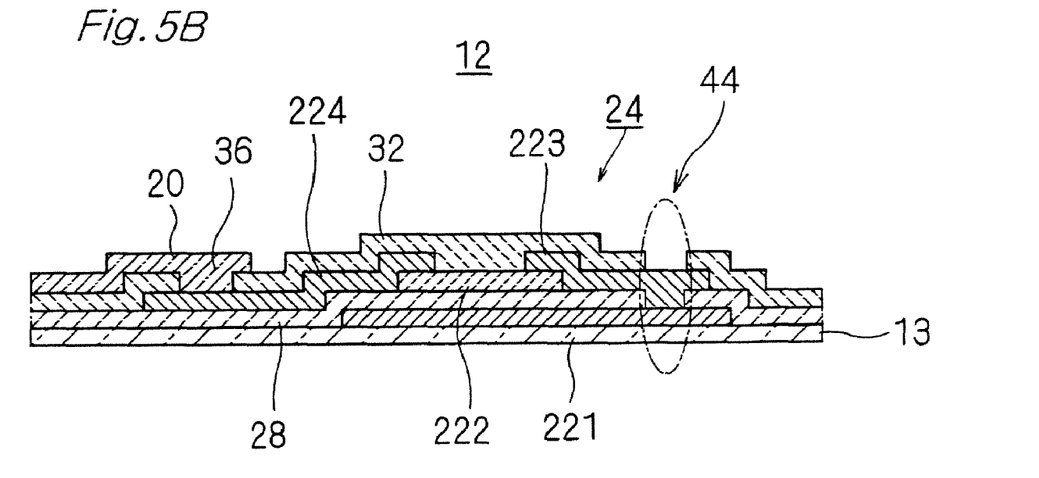

As shown in FIGS. 1-5A, on each pixel dot on the array substrate 12, a repair-use TFT construction 22, which has a construction resembling a TFT and is convertible to a diode by laser working, is arranged at; between the pixel electrode 20, which is associated with "kth" signal line 14-k, and its next one or "(k+1)th" signal line 14-(k+1). When the pixel dot is found to be defective, as shown in FIGS. 4-5B, a gate electrode 221 (an island metal pattern electrically non-connected to others) of the repair-use TFT construction 22 is short-circuited or rendered to be directly connected with a source electrode 223 of the repair-use TFT construction 22 as to form a repairing diode 24. If the repair-use TFT construction 22 is of n-channel mode, the repairing diode 22 exhibits a rectification allowing a one-way current from the source electrode 223 to the drain electrode 224; and thus is equivalent to an n-channel diode as denoted as FIG. 2B and shown in FIG. 1. If the repair-use TFT construction 22 is of p-channel mode, the repairing diode 22 exhibits a rectification allowing a one-way current in a reverse way to the source electrode 223 from the drain electrode 224; and thus is equivalent to an p-channel diode as denoted as FIG. 2C.

Until and unless a repairing process is carried out to a defective pixel dot as shown in FIG. 1, the pixel electrode 20 associated with one signal line 14-k has to be remained as electrically disconnected to the next signal line 14-(k+1). Thus, an electrical circuit has to be remained as opened at between anode of the n-channel diode and the next signal line 14-(k+1) and/or at between cathode of the n-channel diode and the pixel electrode 20. In view of load for driving in respect of the signal lines 14-(k+1) and easiness of repairing procedure, it is preferred that breakage is made only at between anode of the n-channel diode and the next signal line 14-(k+1).

In following, manufacturing process of the array substrate of the LCD device will be explained by use of FIGS. 3-5B.

<1st process step> On a glass substrate 13, aluminum metal layer is deposited as a "gate metal layer" and then is subjected to a patterning by photolithography technique so that; gate electrodes 181 for the pixel-dot TFT 18 as well as gate electrodes 221 for the repair-use TFT construction 22 are formed.

<2nd process step> A gate insulator film 28 is formed by depositing silicon oxides and/or silicon nitrides.

<3rd process step> A semiconductive layer for a semiconductive film 182 of the each pixel-dot TFT 18 and a semiconductive film 222 of the each repair-use TFT construction 22 is formed continuously to depositing of the gate insulator film 28.

<4th process step> The semiconductive layer is subjected to a patterning as to form the semiconductive films 182 and 222 of the channel regions of the TFTs 18 and 22.

<5th process step> An aluminum metal layer is deposited as a "source metal layer" and then is subjected to a patterning so that; source and drain electrodes 183 and 184 for the pixel-dot TFT 18, source and drain electrodes 223 and 224 for the repair-use TFT construction 22 and signal lines 14 are formed.

<6th process step> A passivation film 32 is formed and then contact holes 34 and 36 are formed by a patterning.

<7th process step> An ITO (indium tin oxide) or the like is deposited and then pixel electrodes 20 are formed. Thus, the array substrate 12 of the LCD device 10 is obtained in a manner that each pixel dot is equipped with the repair-use TFT construction 22.

<Inspection> The array substrate 12 thus obtained, or the LCD device 10 assembled by incorporating the array substrate 12, is subjected to an inspection. If the inspection has revealed a defective pixel dot, the pixel electrode 20 of which is associated with a signal line 14-*k*, then repairing as follows is carried out.

<Repairing> A contact-generable portion 42, which is on the repair-use TFT construction 22 in the defective pixel dot, is irradiated with laser beam 50, from obverse face (to be contacted with the liquid crystal) or reverse face of the array substrate 12. In this way, the gate electrode 221 of the repair-use TFT construction 22 is electrically connected with the next signal line 14-(*k*+1) through a contact portion 44 thus generated as a kind of contact hole construction, so that the repairing diode 24 explained before is generated from the repair-use TFT construction 22. If necessary or appropriate, laser cutting is made on a metal pattern 46 that connects the drain electrode 184 of the pixel-dot TFT 18 to the contact hole 34 on the pixel electrode 20, in respect of the defective pixel dot. Such laser-cut portion 48 would eliminate undesirable leakage through a malfunctioned pixel-dot TFT 18.

Figure 6:
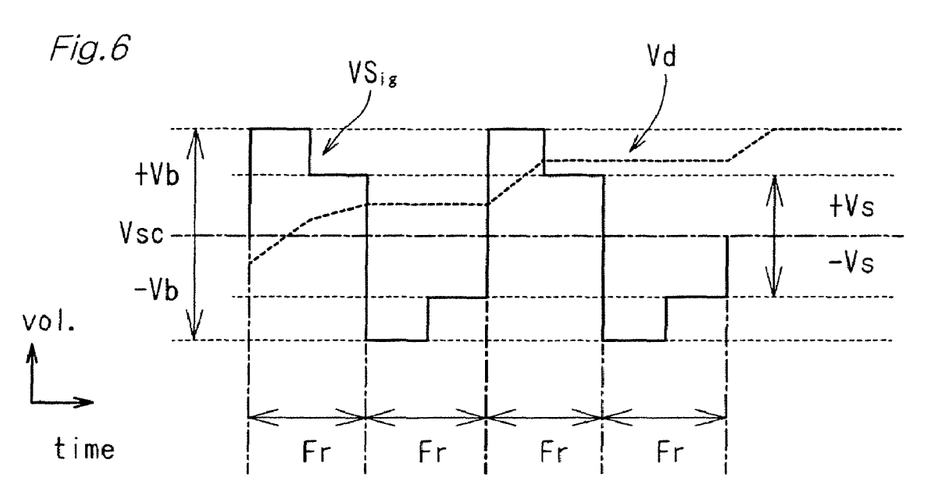
FIG. 6 is a wave-form diagram showing a video signal voltage inputted to a signal line and voltage applied to a pixel electrode, within a few repeats of video frame.

A manner of driving of the LCD device 10 is explained below by use of FIG. 6.

A manner of driving in respect of normal pixel dots is as follows. Column inversion driving is carried out and the inserting of a black fractional frame (at Vb) is made on prior half part of each video frame Fr, which is prior to image fractional frame (at Vs). A signal line voltage Vsig, which is a video signal and is inputted to each signal line 14, oscillates as in a curve shown in FIG. 6. Medium value of such oscillation is denoted as Vsc and amplitude of the oscillation is a black-displaying voltage Vb. Obviously, video image voltage Vs for the image fractional frame may take a value in a range of 0 to Vb ($0 \leq Vs \leq Vb$).

A manner of driving in respect of repaired pixel dots is as follows. As illustrated in the equivalent circuit diagram of FIG. 1, the pixel electrode 20 is disconnected from its pixel-dot TFT 18 and connected with the next signal line 14-(*k*+1) through the repairing diode 24. Thus, through the repairing diode 24 of n-channel mode for example, the pixel electrode 20 is supplied with the signal line voltage Vsig-(k+1) of the next signal line 14-(*k*+1) at and throughout every period where pixel electrode voltage Vd for the repaired pixel dot is exceeded by the signal line voltage Vsig ($Vd \leq Vsig-(k+1)$). Due to the inserting of a black fractional frame, the signal line voltage Vsig takes the maximum value Vsc+Vb; at least once within every pair of consecutive two of the video frames Fr. Consequently, the pixel electrode voltage Vd in the repaired pixel dot becomes as much as the maximum value Vsc+Vb after being charged from the signal line 14-(*k*+1), as shown in FIG. 6, and is kept afterward. Thus, the repaired pixel dot constantly makes black displaying as to be seen as a dark dot.

As explained hereto, by the repairing diode 24, each defective dot is converted to a dark dot, as to completely eliminate luminous dots from the LCD device 10.

When the repairing diode 24 is of p-channel mode as denoted as FIG. 2C, the pixel electrode 20 in the repaired pixel dot is supplied with voltage of the minimum value Vsc−Vb, and thus, the repaired pixel dot constantly makes black displaying, in a same manner as above.

In the above-explained detailed embodiment as shown in FIG. 1 and the others, anode of the repairing diode 24 is connected to the next signal line 14-(*k*+1). Nevertheless, the anode may be connected with anyone of the signal lines 14 including the signal line 14-*k* that is associated with the pixel electrode 20 on the repaired pixel dot through its pixel-dot TFT 18.

What is claimed is:

1. A liquid-crystal display device of OCB mode, comprising:
   signal and scanning lines arranged on an insulator substrate as the signal lines are intersected by the scanning lines to form intersections;
   pixel-dot TFTs arranged respectively in vicinity of the intersections and connected respectively with pixel electrodes, with the signal lines and with the scanning lines; and
   a repair-use construction for each pixel dot, which is convertible to a diode electrically connecting one of the pixel electrodes on the each pixel dot, to one of the signal lines,
   wherein the repair-use construction is arranged between said one of the pixel electrodes and said one of the signal lines, and is constructed as a TFT construction; and gate and source electrodes of the TFT construction are disconnected with each other and connectable as to form the diode.

2. A liquid-crystal display device of OCB mode, comprising:
   signal and scanning lines arranged on an insulator substrate as the signal lines are intersected by the scanning lines to form intersections;
   pixel-dot TFTs arranged respectively in vicinity of the intersections and connected respectively with pixel electrodes, with the signal lines and with the scanning lines;
   a diode electrically connecting one of the pixel electrodes to one of the signal lines; and
   a cut portion disconnecting said one of the pixel electrodes from associated one of the pixel-dot TFTs,
   wherein the diode is arranged between said one of the pixel electrodes and said one of the signal lines, and is constructed as a TFT construction, gate and source electrodes of which are connected as short-circuited with each other.

* * * * *